US007556464B2

(12) United States Patent
Young et al.

(10) Patent No.: US 7,556,464 B2
(45) Date of Patent: Jul. 7, 2009

(54) TWO-WAY DRYWALL LIFT OVERLOAD PROTECTION SYSTEM

(75) Inventors: Larry P. Young, Grand Forks, ND (US); Roland O. Young, Grand Forks, ND (US)

(73) Assignee: Telpro Inc., Grand Forks, ND (US)

( * ) Notice: Subject to any disclaimer, the term of this patent is extended or adjusted under 35 U.S.C. 154(b) by 235 days.

(21) Appl. No.: 11/672,516

(22) Filed: Feb. 7, 2007

(65) Prior Publication Data

US 2008/0187411 A1 Aug. 7, 2008

(51) Int. Cl.
*E04G 21/14* (2006.01)
*B60P 1/14* (2006.01)

(52) U.S. Cl. ........................................ 414/11; 254/4 R

(58) Field of Classification Search ......... 254/318–319, 254/350, 44, 4 R, 299; 414/10–12
See application file for complete search history.

(56) References Cited

U.S. PATENT DOCUMENTS 3,645,519 A * 2/1972 Schwarz et al. ............. 266/226
3,828,942 A * 8/1974 Young ......................... 414/11
4,372,535 A * 2/1983 Gibson et al. ............... 254/319
4,683,994 A * 8/1987 Weisenfelder .............. 192/3.61
4,932,176 A * 6/1990 Roberts et al. ................ 52/118
5,002,259 A * 3/1991 Manning et al. ............ 254/350
5,078,364 A * 1/1992 Harrell ....................... 254/387
5,368,429 A * 11/1994 Young ......................... 414/11

* cited by examiner

*Primary Examiner*—Gregory W Adams

(57) ABSTRACT

A two-way drywall lift overload protection system for reliably preventing the application of an overloading input force or an overloading weight force from an elevated load. The two-way drywall lift overload protection system generally includes a telescoping drywall lifter to lift and lower a load, wherein said telescoping drywall lifter includes a plurality of legs, a lower lifting member, a plurality of telescoping lifting members extending upwardly from said lower lifting member and an upper support, a winch attached to said telescoping drywall lifter, a brake unit connected to said winch, a slip clutch mechanically connected to said telescoping drywall lifter to selectively extend and retract said lower lifting member and said plurality of telescoping lifting members, and a main elongated member connected between said winch and said slip clutch.

16 Claims, 7 Drawing Sheets

TWO-WAY DRYWALL LIFT OVERLOAD PROTECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to drywall lifters and more specifically it relates to a two-way drywall lift overload protection system for reliably preventing the application of an overloading input force or an overloading weight force from an elevated load.

2. Description of the Related Art

Any discussion of the prior art throughout the specification should in no way be considered as an admission that such prior art is widely known or forms part of common general knowledge in the field.

Drywall lifters have been in use for years. A conventional drywall lifter is comprised of a telescoping structure attached to a base, an upper support attached to an upper portion of the telescoping structure and a drive unit mechanically connected to the telescoping structure to selectively lift and lower the telescoping structure. The drive unit may be manual or hydraulic. A drywall panel is positioned upon the upper support and is thereby raised to a desired position on a ceiling for securing by workers with conventional fasteners and then removed after fastening. U.S. Pat. No. 5,586,619 (hydraulic lifter) to Roland Young, U.S. Pat. No. 5,368,429 (manual lifter) to Roland Young and U.S. Pat. No. 3,828,942 (manual lifter) illustrate examples of conventional drywall lifters.

While some drywall lifters utilize a slip clutch on the input force side, they utilize a one way brake on the weight force side which limits the slip clutch to only usage one way from the input force side as illustrated in FIG. 1 of the drawings. Hence, if an overload weight force is applied, the one way brake is prone to breakage after a weight level has been reached which can result in damage to the drywall lifter and possibly personal injury.

Hence, there is a need for a drywall lifter that prevents an overload failure on the weight force side of the drywall lifter to prevent damage to the drywall lifter and to prevent personal injury.

BRIEF SUMMARY OF THE INVENTION

The general purpose of the present invention is to provide a two-way drywall lift overload protection system that has many of the advantages of the drywall lifters mentioned heretofore. The invention generally relates to a drywall lifter which includes a telescoping drywall lifter to lift and lower a load, wherein said telescoping drywall lifter includes a plurality of legs, a lower lifting member, a plurality of telescoping lifting members extending upwardly from said lower lifting member and an upper support, a winch attached to said telescoping drywall lifter, a brake unit connected to said winch, a slip clutch mechanically connected to said telescoping drywall lifter to selectively extend and retract said lower lifting member and said plurality of telescoping lifting members, and a main elongated member connected between said winch and said slip clutch.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a two-way drywall lift overload protection system for reliably preventing the application of an overloading input force or an overloading weight force from an elevated load.

Another object is to provide a two-way drywall lift overload protection system that prevents an overload failure on the weight force side of the drywall lifter to prevent damage to the drywall lifter and to prevent personal injury.

An additional object is to provide a two-way drywall lift overload protection system that may be utilized upon various types of drywall lifters.

A further object is to provide a two-way drywall lift overload protection system that prevents the free falling of a load supported by a drywall lifter.

Another object is to provide a two-way drywall lift overload protection system that may be utilized upon manual drywall lifters and powered drywall lifters.

A further object is to provide a two-way drywall lift overload protection system that provides for controlled descending of an overloading weight force applied by a supported load.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
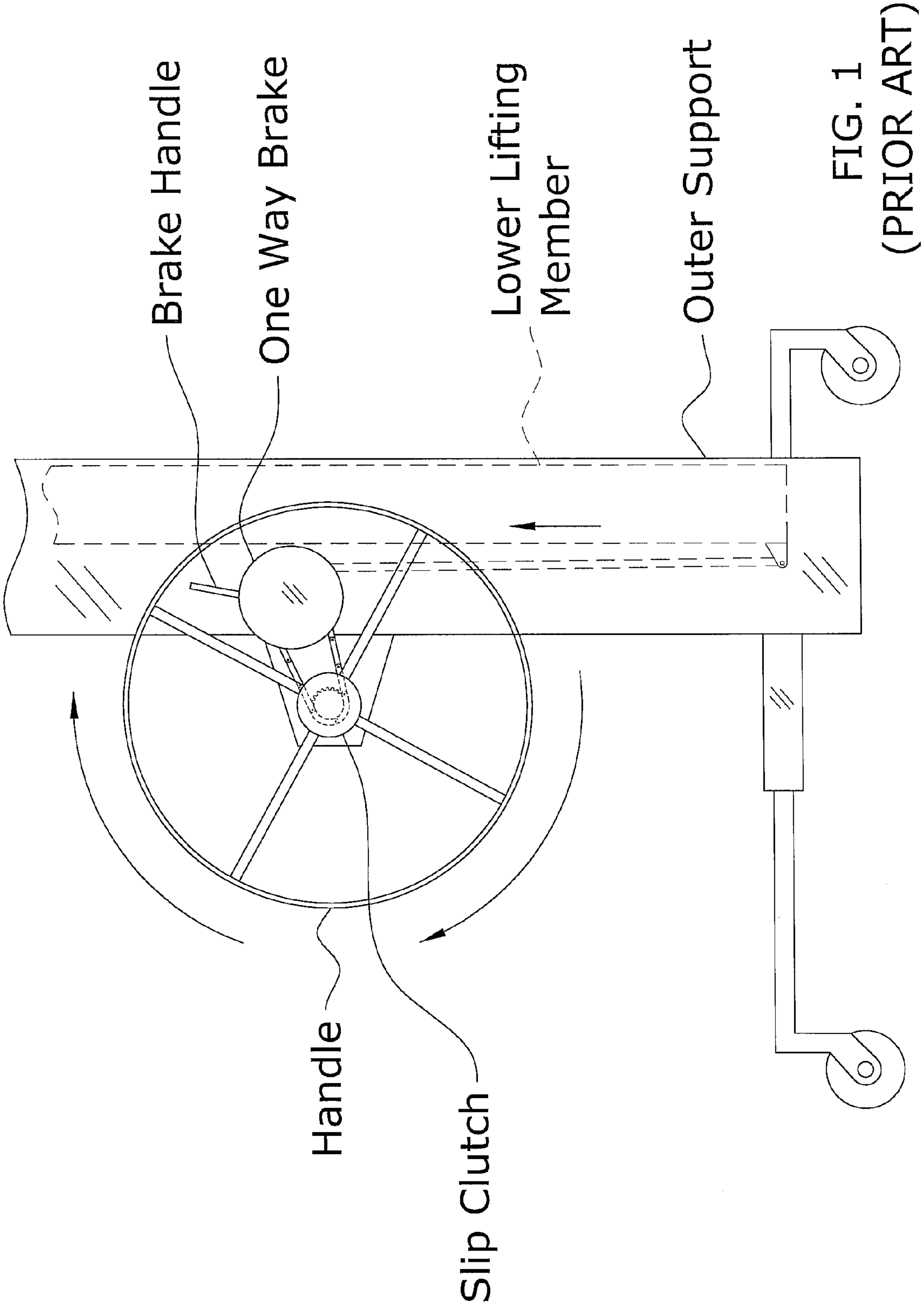
FIG. 1 (PRIOR ART)
FIG. 1 is a side view of a prior art overload protection system with the slip clutch connected to the input force side and with the one way brake connected to the weight force side.
Figure 2:
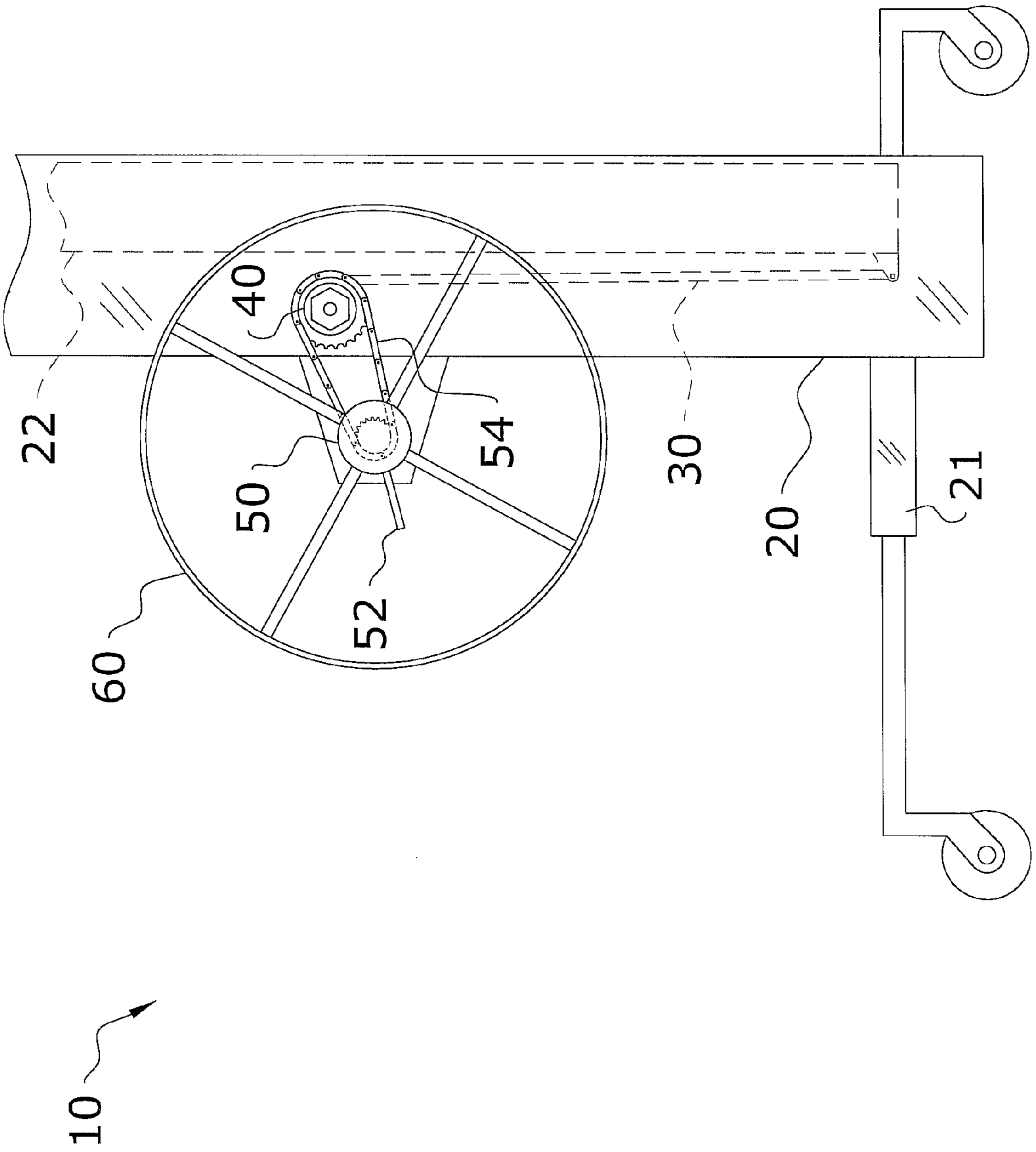
FIG. 2 is a side view of the present invention illustrating the one way brake connected to the input force side and the slip clutch connected to the weight force side.

Turning now descriptively to the drawings, in which similar reference characters denote similar elements throughout the several views, FIGS. 2 through 7 illustrate a two-way drywall lift overload protection system 10, which comprises a telescoping drywall lifter to lift and lower a load 12, wherein said telescoping drywall lifter includes a plurality of legs 21, a lower lifting member 22, a plurality of telescoping lifting members 24 extending upwardly from said lower lifting member 22 and an upper support 26, a winch attached to said telescoping drywall lifter, a brake unit 50 connected to said winch, a slip clutch 40 mechanically connected to said telescoping drywall lifter to selectively extend and retract said lower lifting member 22 and said plurality of telescoping lifting members 24, and a main elongated member 54 connected between said winch and said slip clutch 40.

B. Telescoping Drywall Lifter

Figure 3:
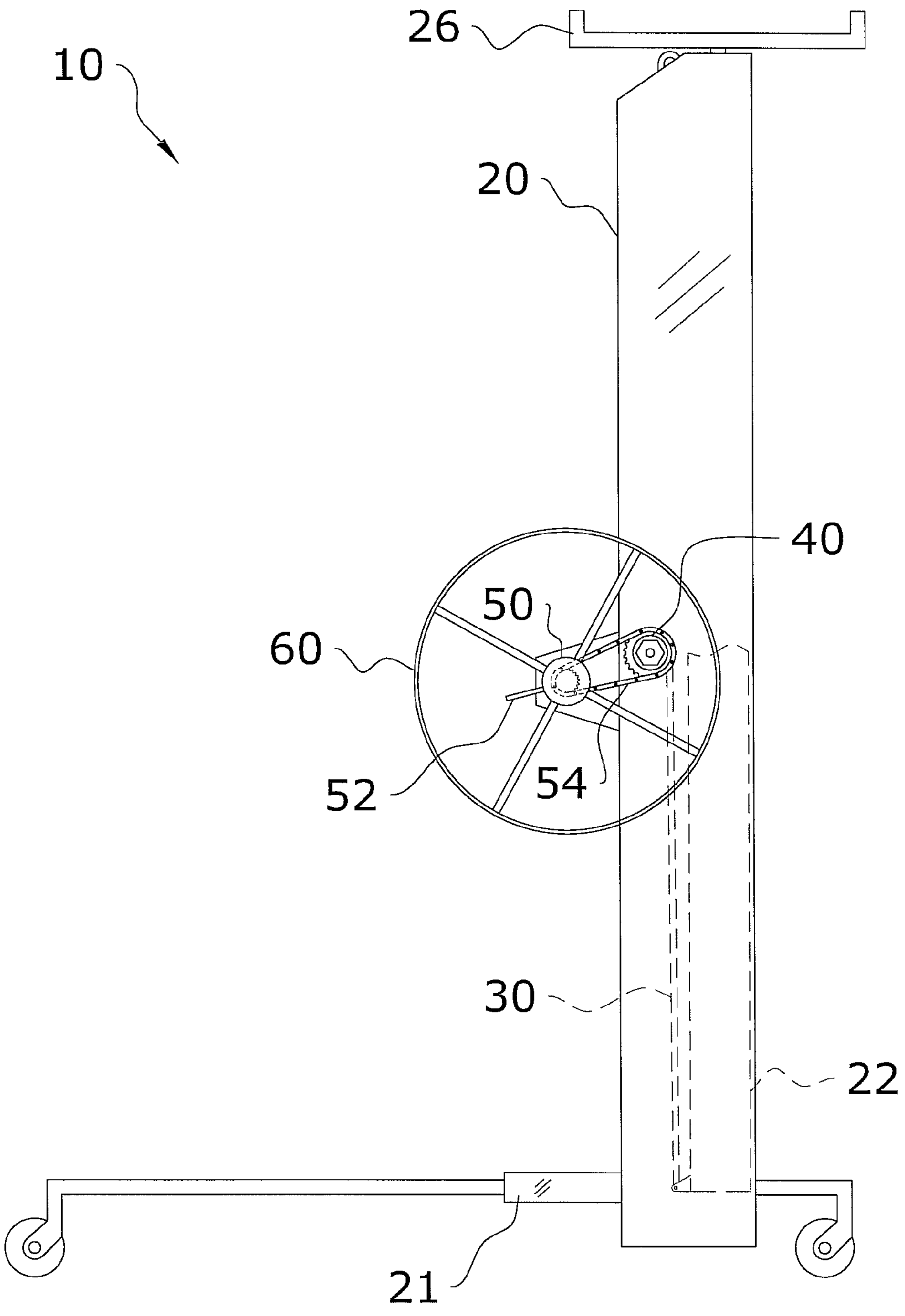
FIG. 3 is a side view of the present invention with the drywall lifter in a lowered position.
Figure 4:
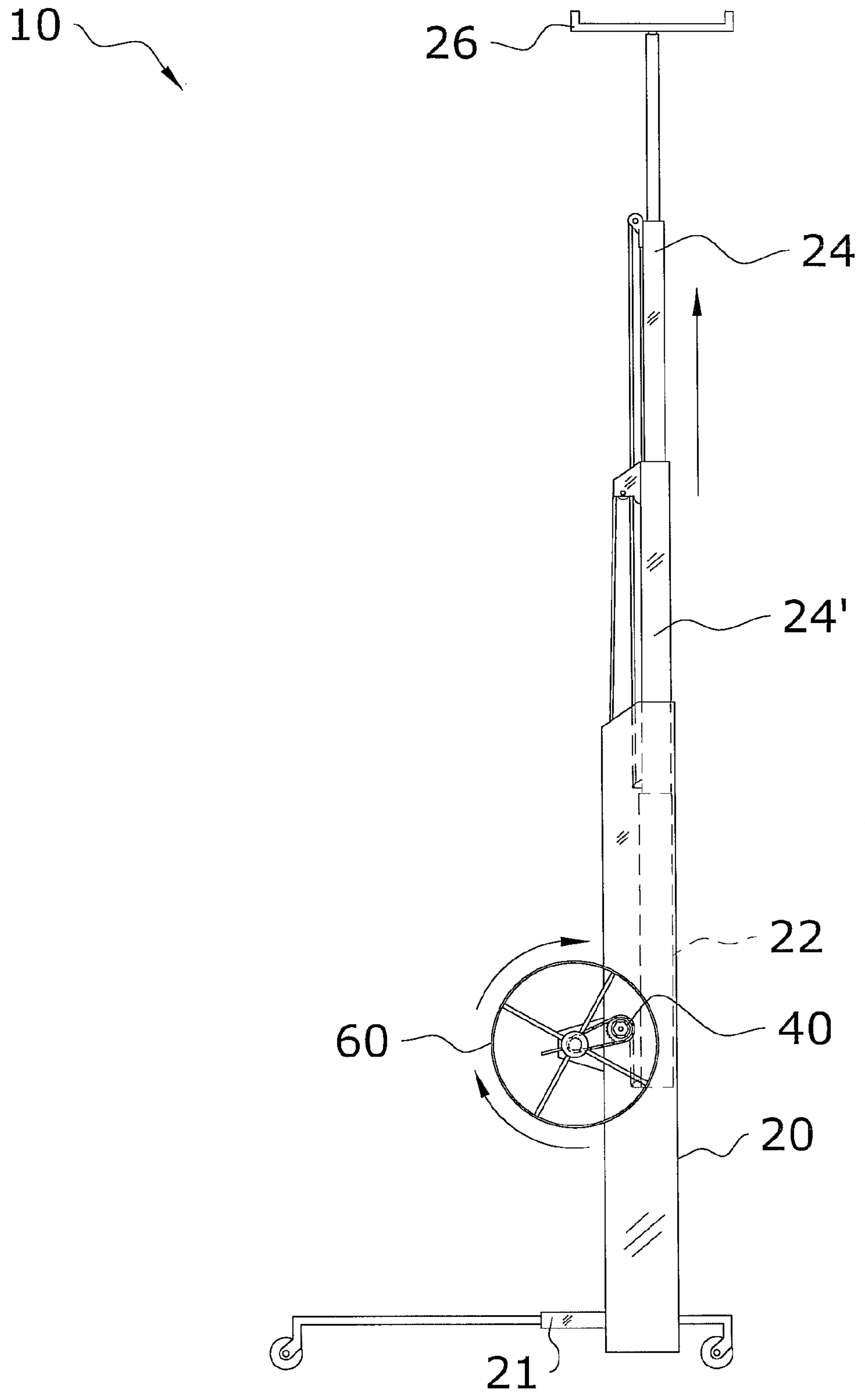
FIG. 4 is a side view of the present invention with the drywall lifter in the raised position.
Figure 5:
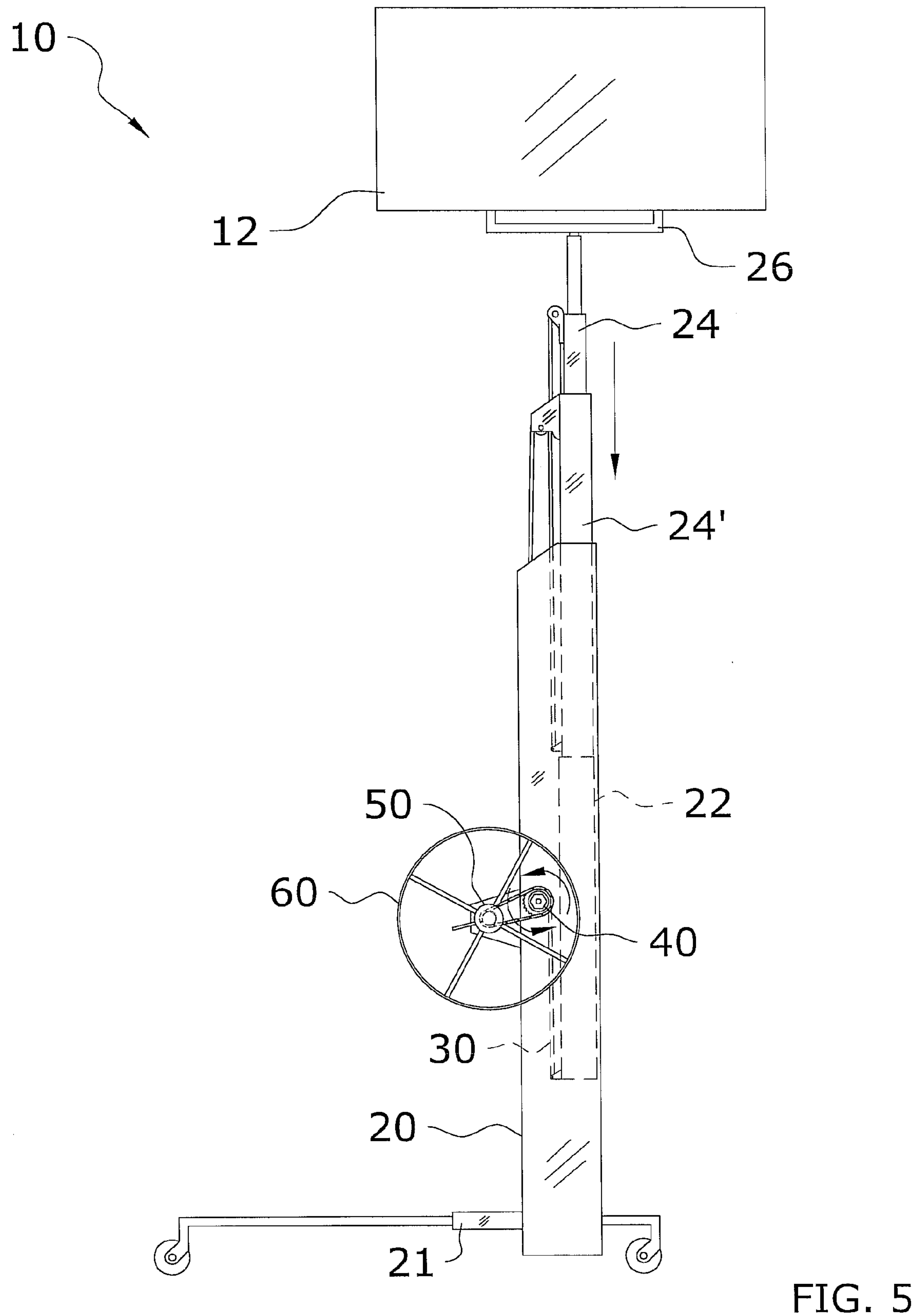
FIG. 5 is a side view of the present invention with the drywall lifter in the raised position supporting a load.

FIGS. 3 and 4 illustrate an exemplary telescoping drywall lifter. The telescoping drywall lifter is capable of lifting and lowering a load 12 such as but not limited to a drywall panel (e.g. plasterboard, paneling, wooden panels, composite panels, bricks and the like).

The telescoping drywall lifter includes a plurality of legs 21, a lower lifting member 22, a plurality of telescoping lifting members 24 extending upwardly from the lower lifting member 22 and an upper support 26. The lower lifting member 22 is vertically movable within an outer support 20 attached to the legs 21 as illustrated in FIG. 4 of the drawings. The outer support 20 is comprised of a tubular vertical structure that receives a significant portion of the telescoping structure when retracted as shown in FIGS. 1 through 4 of the drawings.

U.S. Pat. No. 5,586,619 (hydraulic lifter) to Roland Young, U.S. Pat. No. 5,368,429 (manual lifter) to Roland Young and U.S. Pat. No. 3,828,942 (manual lifter) illustrate examples of conventional drywall lifters that may be utilized within the present invention and are hereby incorporated by reference herein.

C. Winch

The winch is attached to the telescoping drywall lifter and is used to mechanically lift and lower the lifting structure of the drywall lifter resulting in the corresponding lifting or lowering of a load 12. The winch may be comprised of a manually operated device (e.g. handle 60) or a motor operated device (e.g. hydraulic pump, electric motor). The winch is capable of inputting varying forces required to lift and lower a load 12 positioned upon the drywall lifter.

D. Brake Unit

The brake unit 50 is connected to the winch to selectively prevent the telescoping drywall lifter from lowering the load 12. The brake unit 50 is capable of preventing lowering of the load 12 up to a first torque limit which is comprised of a torque level that results in failure of the brake unit 50. A control lever 52 or similar structure is used to engage the brake unit to prevent rotation of the winch and the main elongated member 54. U.S. Pat. No. 3,828,942 to Young illustrates an exemplary brake unit 50 and is hereby incorporated by reference herein.

E. Slip Clutch

A main elongated member 54 is connected between the winch and the slip clutch 40 to transfer mechanical force between the same. The main elongated member 54 is comprised of an endless loop structure such as but not limited to a chain or cable.

The slip clutch 40 is mechanically connected to the telescoping drywall lifter to selectively extend and retract the lower lifting member 22 and the plurality of telescoping lifting members 24 as shown in FIGS. 2 through 7 of the drawings. The slip clutch 40 prevents slippage up to a second torque limit. The slip clutch 40 is preferably adjustable to allow for adjustment of the second torque limit depending upon the application of usage.

The second torque limit is less than the first torque limit to prevent damage to the brake unit 50 by the load 12 having an excessive weight. It is preferable that the second torque limit is significantly less than the first torque limit to prevent continued exposure of the brake unit 50 to excessively heavy loads 12 (e.g. 500 pounds or more).

Figure 6:
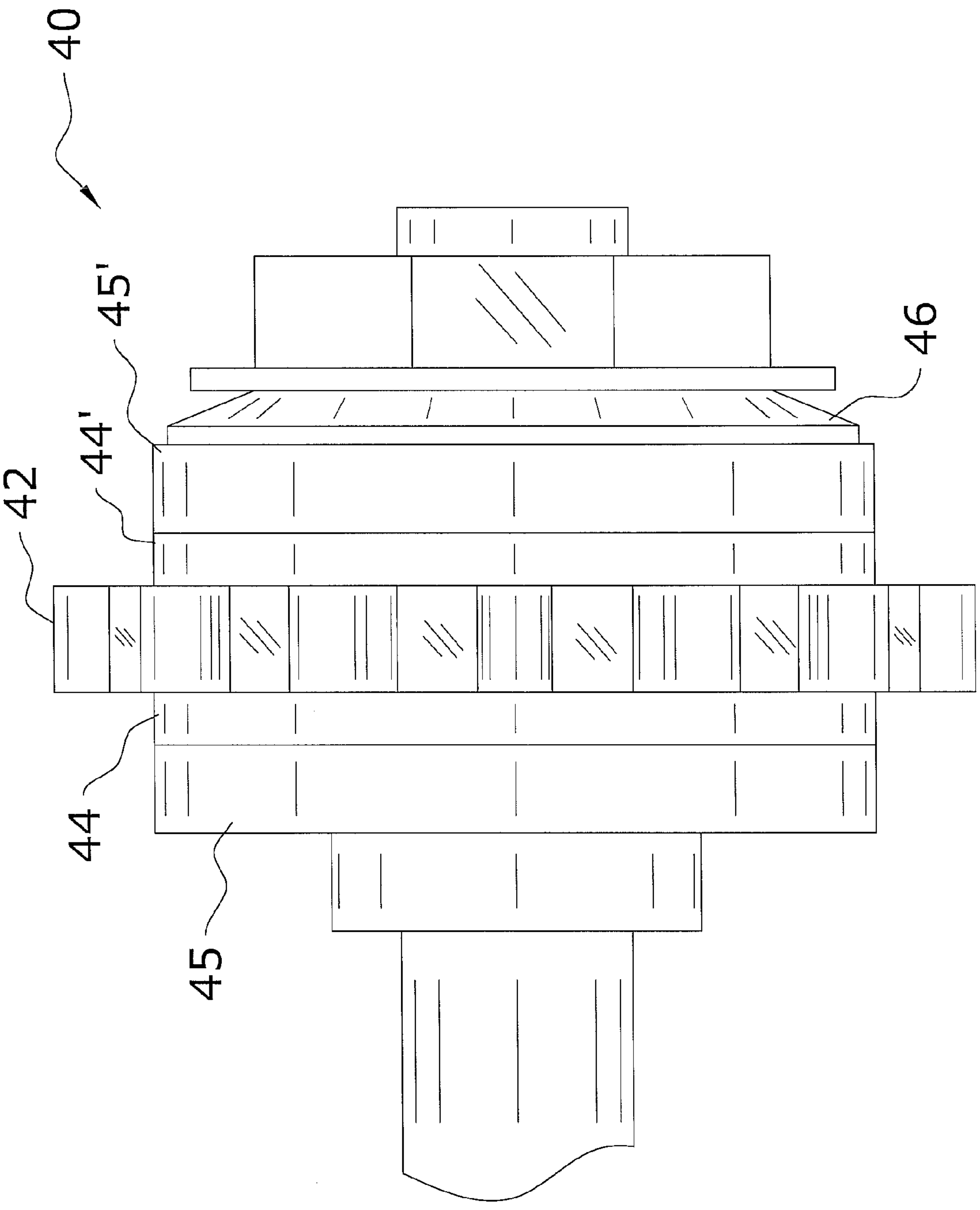
FIG. 6 is a front view of the slip clutch.
Figure 7:
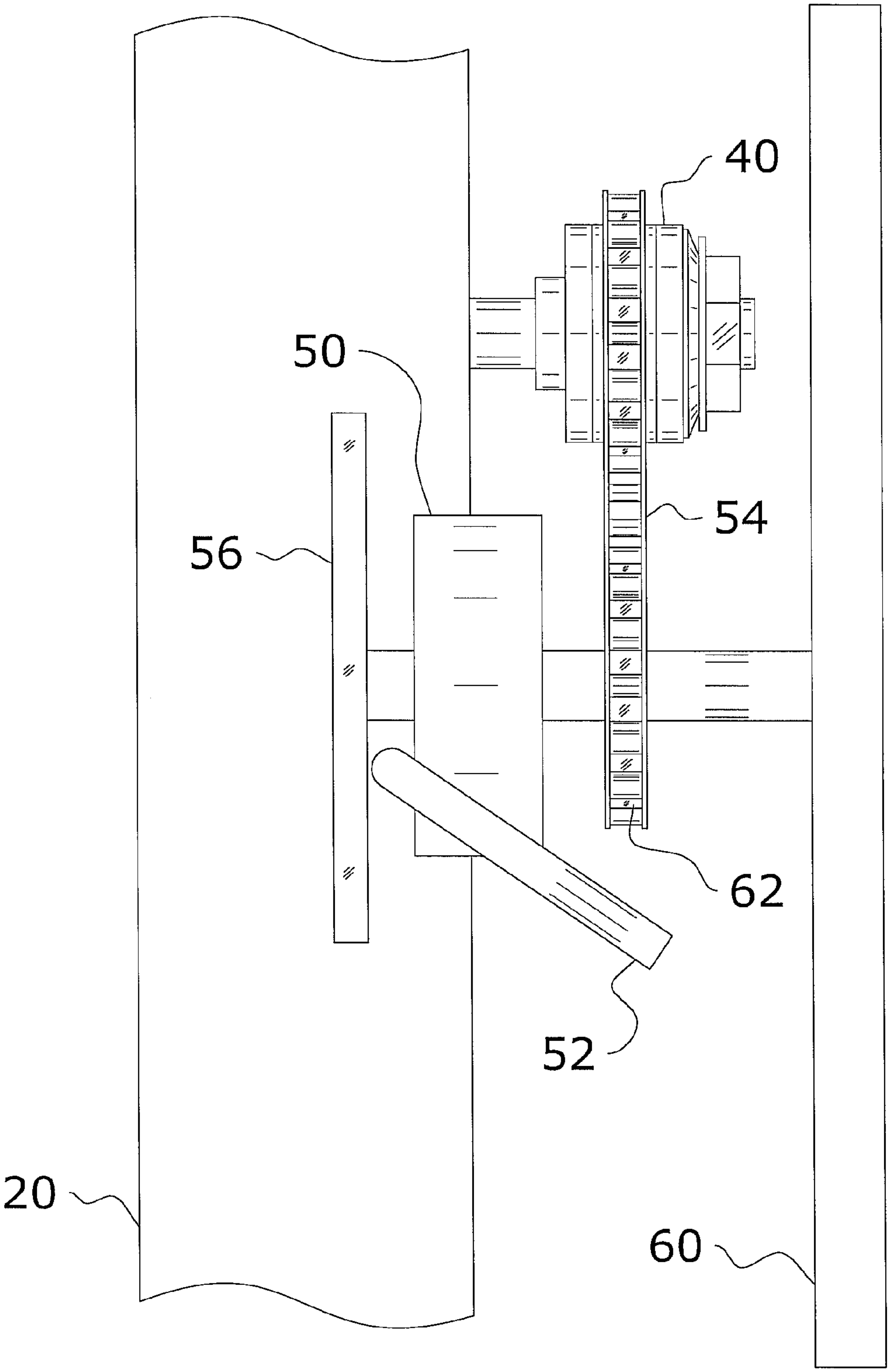
FIG. 7 is a front view of the present invention.

The winch includes a drive sprocket 62 connected to the main elongated member 54 as shown in FIG. 7 of the drawings. The slip clutch 40 includes a secondary sprocket 42 connected to the main elongated member 54. The slip clutch 40 is preferably comprised of a pair of friction members 44, 44' on opposing sides of the secondary sprocket 42 and a pair of plates 45, 45' positioned on opposite sides of the pair of friction members 44, 44' as shown in FIG. 6 of the drawings.

A spring 46 is preferably positioned adjacent to one of the plates 45, 45' to provide a biasing force on the friction members 44, 44' against the secondary sprocket 42 as shown in FIG. 6 of the drawings. A fastener nut may be utilized to selectively apply additional force upon the spring 46. The pair of plates 45, 45' are concentrically connected to a shaft and the secondary sprocket 42 is rotatably positioned upon the shaft to allow for free rotation about the same unless engaged by the friction members 44, 44'

A first elongated member 30 is connected between the slip clutch 40 and the lower lifting member 22 as shown in FIG. 3 of the drawings. In particular, the first elongated member 30 is attached to another sprocket attached to the shaft supporting the slip clutch 40. The first elongated member 30 is used to lift and lower the lower lifting member 22 resulting in the corresponding lifting and lowering of the telescoping lifting members 24.

F. Operation of Preferred Embodiment

In use, a load 12 (e.g. drywall sheet, etc.) is positioned upon the upper support 26 of the drywall lifter. Through the winch, rotational force is applied to the slip clutch 40 which in turn transfers the force to the telescoping structure of the drywall lifter. If the rotational force applies exceeds the second torque limit, then the slip clutch 40 correspondingly slips reducing the force applied to the telescoping lifting structure thereby preventing damage to the drywall lifter and to the load 12 being positioned. Once the load 12 is fully raised, the brake unit 50 is then set to prevent lowering of the load 12 by preventing rotation of the main elongated member 54. The load 12 may then be lowered by releasing the brake unit 50 and operating the winch accordingly.

If the load 12 increases in weight while the drywall lifter is either fully extended or partially extended (e.g. bricks or other objects positioned on the upper support 26 when in the raised position), the slip clutch 40 will release if the reverse torque applied by the load 12 exceeds the second torque limit. When the slip clutch 40 releases because of an excessively heavy load 12 (e.g. 500 pounds), the load 12 automatically lowers in a controlled and stable manner without applying a torque that exceeds the first torque limit of the brake unit 50. This prevents a free fall of the load 12 and also prevents damage to the drywall lifter. The excessively heavy load 12 continues to lower until the drywall lifter is fully retracted or the weight of the load 12 is reduced sufficiently to reduce the torque applied to the slip clutch 40 below the second torque limit.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A two-way drywall lift overload protection system, comprising:
- a telescoping drywall lifter to lift and lower a load, wherein said telescoping drywall lifter includes a plurality of legs, a lower lifting member, a plurality of telescoping lifting members extending upwardly from said lower lifting member and an upper support to support said load;
- a winch attached to said telescoping drywall lifter;
- a brake unit connected to said winch;
- a slip clutch mechanically connected to said telescoping drywall lifter to selectively extend and retract said lower lifting member and said plurality of telescoping lifting members; and
- a main elongated member connected between said winch and said slip clutch;
- wherein said winch includes a drive sprocket connected to said main elongated member and wherein said slip clutch includes a secondary sprocket connected to said main elongated member;
- wherein said slip clutch is comprised of a pair of friction members on opposing sides of said secondary sprocket and a pair of plates positioned on opposite sides of said pair of friction members.

2. The two-way drywall lift overload protection system of claim 1, wherein said load is comprised of a drywall panel.

3. The two-way drywall lift overload protection system of claim 1, wherein said winch is manually operated.

4. The two-way drywall lift overload protection system of claim 1, wherein said winch includes a motor.

5. The two-way drywall lift overload protection system of claim 1, including a spring positioned adjacent to one of said plates.

6. The two-way drywall lift overload protection system of claim 1, wherein said pair of plates are concentrically connected to a shaft, wherein said secondary sprocket is rotatably positioned upon said shaft.

7. The two-way drywall lift overload protection system of claim 1, wherein said slip clutch is adjustable to allow adjustment of a torque limit.

8. The two-way drywall lift overload protection system of claim 1, wherein said main elongated member is comprised of an endless loop structure.

9. A two-way drywall lift overload protection system, comprising:
- a telescoping drywall lifter to lift and lower a load, wherein said telescoping drywall lifter includes a plurality of legs, a lower lifting member, a plurality of telescoping lifting members extending upwardly from said lower lifting member and an upper support to support said load;
- a winch attached to said telescoping drywall lifter;
- a brake unit connected to said winch, wherein said brake unit is capable of preventing lowering of said load up to a first torque limit;
- a slip clutch mechanically connected to said telescoping drywall lifter to selectively extend and retract said lower lifting member and said plurality of telescoping lifting members;
- wherein said slip clutch prevents slippage up to a second torque limit, wherein said second torque limit is less than said first torque limit to prevent damage to said brake unit by said load having an excessive weight; and
- a main elongated member connected between said winch and said slip clutch;
- wherein said winch includes a drive sprocket connected to said main elongated member and wherein said slip clutch includes a secondary sprocket connected to said main elongated member;
- wherein said slip clutch is comprised of a pair of friction members on opposing sides of said secondary sprocket and a pair of plates positioned on opposite sides of said pair of friction members.

10. The two-way drywall lift overload protection system of claim 9, wherein said load is comprised of a drywall panel.

11. The two-way drywall lift overload protection system of claim 9, wherein said winch is manually operated.

12. The two-way drywall lift overload protection system of claim 9, wherein said winch includes a motor.

13. The two-way drywall lift overload protection system of claim 9, including a spring positioned adjacent to one of said plates.

14. The two-way drywall lift overload protection system of claim 9, wherein said pair of plates are concentrically connected to a shaft, wherein said secondary sprocket is rotatably positioned upon said shaft.

15. The two-way drywall lift overload protection system of claim 9, wherein said slip clutch is adjustable to allow adjustment of said second torque limit.

16. The two-way drywall lift overload protection system of claim 9, wherein said main elongated member is comprised of an endless loop structure.

* * * * *